United States Patent
Fontaine et al.

(10) Patent No.: US 10,558,640 B2
(45) Date of Patent: Feb. 11, 2020

(54) DYNAMICALLY ADDING CUSTOM DATA DEFINITION LANGUAGE SYNTAX TO A DATABASE MANAGEMENT SYSTEM

(71) Applicant: INTERNATIONAL BUSINESS MACHINES CORPORATION, Armonk, NY (US)

(72) Inventors: Jeffrey G. Fontaine, San Jose, CA (US); Kevin D. Hite, San Jose, CA (US); Richard V. Tran, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 15/482,918

(22) Filed: Apr. 10, 2017

(65) Prior Publication Data

US 2018/0293263 A1    Oct. 11, 2018

(51) Int. Cl.
*G06F 7/00* (2006.01)
*G06F 16/23* (2019.01)
*G06F 16/21* (2019.01)
*G06F 16/2455* (2019.01)

(52) U.S. Cl.
CPC ........ *G06F 16/2336* (2019.01); *G06F 16/213* (2019.01); *G06F 16/24565* (2019.01)

(58) Field of Classification Search
CPC .... G06F 16/81; G06F 16/86; G06F 16/24544; G06F 16/217; G06F 16/258; G06F 16/214; G06F 16/275
See application file for complete search history.

(56) References Cited

U.S. PATENT DOCUMENTS

| | | | |
|---|---|---|---|
| 5,732,262 A * | 3/1998 | Gillespie | G06F 16/21 707/802 |
| 6,795,868 B1 * | 9/2004 | Dingman | G06F 16/258 709/246 |
| 7,299,237 B1 | 11/2007 | Clark et al. | |
| 7,403,956 B2 * | 7/2008 | Vaschillo | G06F 16/284 707/770 |
| 7,523,118 B2 * | 4/2009 | Friedlander | G06F 16/283 |
| 7,912,862 B2 * | 3/2011 | Vaschillo | G06F 16/284 707/791 |
| 7,925,668 B2 * | 4/2011 | Breining | G06F 16/83 707/791 |
| 8,001,151 B2 * | 8/2011 | Breining | G06F 16/83 707/791 |

(Continued)

OTHER PUBLICATIONS

M. Elamparithi et al., "A review on database migration strategies, techniques and tools", World Journal of Computer Application and Technology 3(3), 2015, pp. 41-48.

*Primary Examiner* — Daniel A Kuddus
(74) *Attorney, Agent, or Firm* — Cantor Colburn LLP; Teddi Maranzano

(57) ABSTRACT

A computer-implemented method includes receiving, via original Data Definition Language (DDL) syntax of a Database Management System (DBMS), a definition of custom DDL syntax. Metadata describing the custom DDL syntax is stored in a global catalog of the DBMS. A first DDL statement that utilizes the custom DDL syntax is received. The metadata describing the custom DDL syntax is read from the global catalog. The first DDL statement is processed, using a computer processor, according to the metadata.

14 Claims, 4 Drawing Sheets

(56) References Cited

U.S. PATENT DOCUMENTS

| | | | |
|---|---|---|---|
| 8,122,066 B2* | 2/2012 | Castellanos | G06F 16/217 707/803 |
| 2004/0186826 A1* | 9/2004 | Choi | G06F 16/24553 |
| 2005/0050069 A1* | 3/2005 | Vaschillo | G06F 16/284 |
| 2007/0276851 A1* | 11/2007 | Friedlander | G06F 16/283 |
| 2008/0306976 A1 | 12/2008 | Agbeblewu et al. | |
| 2010/0094823 A1* | 4/2010 | Lemaire | G06F 16/9535 707/705 |
| 2010/0094838 A1* | 4/2010 | Kozak | G06F 16/2443 707/705 |
| 2011/0040794 A1* | 2/2011 | Breining | G06F 16/83 707/791 |
| 2015/0248403 A1 | 9/2015 | Pazdziora et al. | |
| 2015/0254315 A1* | 9/2015 | Charlet | G06F 16/245 707/756 |
| 2015/0254316 A1* | 9/2015 | Charlet | G06F 16/245 707/756 |
| 2015/0363435 A1* | 12/2015 | Ott | G06F 16/212 707/803 |
| 2016/0092594 A1* | 3/2016 | Deshmukh | G06F 16/24534 707/763 |
| 2016/0210328 A1* | 7/2016 | Bendel | G06F 16/24544 |
| 2016/0328442 A1* | 11/2016 | Waas | G06F 16/252 |

* cited by examiner

DYNAMICALLY ADDING CUSTOM DATA DEFINITION LANGUAGE SYNTAX TO A DATABASE MANAGEMENT SYSTEM

BACKGROUND

Embodiments of the present invention relate to Database Management Systems (DBMSs) and, more specifically, to dynamically adding custom data definition language (DDL) syntax to a DBMS.

A DDL is a language for defining data structures, such as database schemas, in a DBMS. For example, DDL commands can include commands to create and drop (i.e., remove) database components, along with specifying constraints for those commands. A DDL syntax is the syntax in which a DDL is expressed.

For most DBMSs, the only way to generate a data definition for a DBMS is through the DBMS's associated DDL syntax. While DBMSs may overlap in their support of subsets of DDL syntax, it is unlikely that two distinct DBMSs support the exact same DDL syntax.

SUMMARY

According to an embodiment of this invention, a computer-implemented method includes receiving, via original DDL syntax of a DBMS, a definition of custom DDL syntax. Metadata describing the custom DDL syntax is stored in a global catalog of the DBMS. A first DDL statement that utilizes the custom DDL syntax is received. The metadata describing the custom DDL syntax is read from the global catalog. The first DDL statement is processed, using a computer processor, according to the metadata.

In another embodiment, a system includes a memory having computer-readable instructions and one or more processors for executing the computer-readable instructions. The computer-readable instructions include receiving, via original DDL syntax of a DBMS, a definition of custom DDL syntax. Further according to the computer-readable instructions, metadata describing the custom DDL syntax is stored in a global catalog of the DBMS. A first DDL statement that utilizes the custom DDL syntax is received. The metadata describing the custom DDL syntax is read from the global catalog. The first DDL statement is processed according to the metadata.

In yet another embodiment, a computer-program product for utilizing custom syntax in a DBMS includes a computer-readable storage medium having program instructions embodied therewith. The program instructions are executable by a processor to cause the processor to perform a method. The method includes receiving, via original DDL syntax of a DBMS, a definition of custom DDL syntax. Further according to the method, metadata describing the custom DDL syntax is stored in a global catalog of the DBMS. A first DDL statement that utilizes the custom DDL syntax is received. The metadata describing the custom DDL syntax is read from the global catalog. The first DDL statement is processed according to the metadata.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In some cases, it may be desirable for a DDL script designed for a source DBMS to be used in a different, target DBMS. However, given that the DDL syntax of the source DBMS is likely not an exact match with the DDL syntax of the target DBMS, it is not likely that the DDL script will be portable, especially if that DDL script is complex. Similarly, it is difficult to port database schemas between DBMSs as those are also written using DDL syntax. A converter exists between DB2® and Oracle® DBMSs for migrating databases between the two systems. However, this converter requires the use of a conversion utility that remains updated with the current DDL version for each DBMS. In other words, such a converter requires detailed knowledge of the DBMSs in question.

Turning now to an overview of aspects of the present invention, some embodiments enable the definition of custom DDL syntax, which can be used for a more dynamic transformation between DBMSs, or to enable a target DBMS to consume DDL statements from a source DBMS. Specifically, in some embodiments, a customization system according to some embodiments of the invention supports DDL syntax that can be used to define custom DDL syntax. This custom syntax may be in the form of custom statements and custom keywords, as well as behaviors for custom DDL statements, custom keywords, and phases. Each such definition or addition of behavior may include a reference to custom logic in the form of programming code, and metadata describing the resulting custom DDL syntax may be stored in a global catalog of the DBMS.

Figure 1:
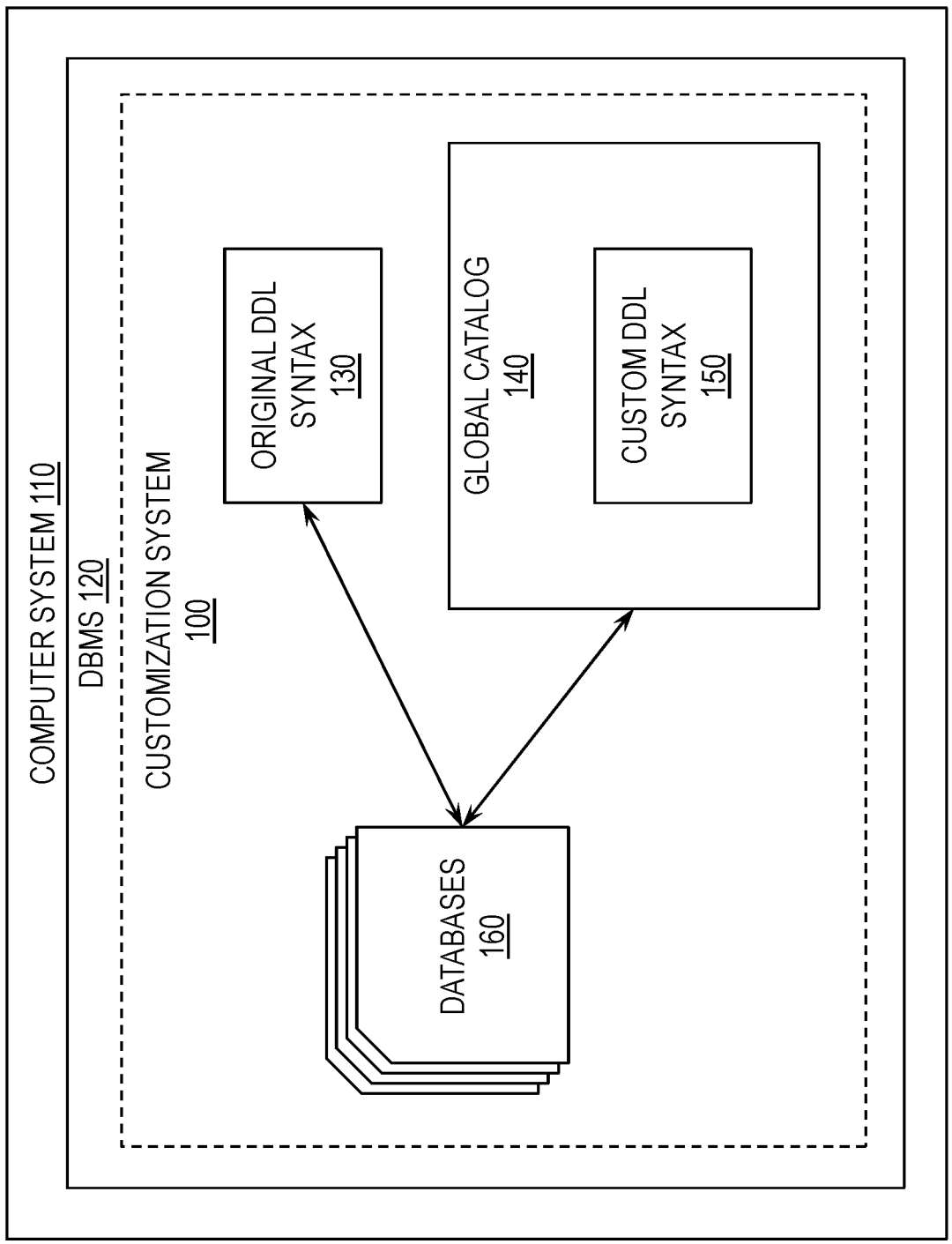
FIG. 1 is a block diagram of a customization system, according to some embodiments of this invention.

FIG. 1 is a block diagram of a customization system 100, according to some embodiments of this invention. As shown, the customization system 100 may be integrated into a computer system 110, on which may run a DBMS 120. The DBMS 120 may support original DDL syntax 130 and may include a global catalog 140 on which metadata describing custom DDL syntax 150 may be stored. In some embodiments, the custom DDL syntax 150 is given priority over the original DDL syntax 130, such that custom DDL syntax 150 may supplant original DDL syntax 130 with which it conflicts. The DBMS 120 may manage one or more databases 160, and such management may include processing of DDL statements in one or both of the original DDL syntax 130 and the custom DDL syntax 150.

In some embodiments, the original DDL syntax 130 may be supported by the DBMS 120 before the definition of the custom DDL syntax 150. For example, the original DDL syntax 130 may include DDL syntax that is native to the DBMS 120 as well as additional DDL syntax, as described below, to support defining custom DDL syntax 150. Implementation of the original DDL syntax 130 that is useable to define custom DDL syntax 150 may be coded into the customization system 100 of the DBMS 120 to perform in the manner discussed below. When custom DDL syntax 150 is defined via the original DDL syntax 130, metadata describing the custom DDL syntax 150 may be stored in a reserved DBMS table in the global catalog 140 of the DBMS 120. As a result, in some embodiments, the custom DDL syntax 150 is applicable to each database 160 in the DBMS 120.

Custom DDL syntax can be used for various purposes, such as, for example, adding new functionality to the DBMS 120 or porting functionality from a different DBMS to the DBMS 120 incorporating the customization system 100. For example, and not by way of limitation, custom DDL syntax 150 may be defined to enable custom partitioning, custom compression routines, and custom indexing that is not otherwise supported by the DBMS.

According to some embodiments, the customization system 100 includes two stages for using custom DDL syntax 150: defining and consuming. Specifically, the defining stage may include defining custom DDL syntax 150, which may include defining one or more corresponding behaviors associated with the new syntax. The consuming stage may include consumption of DDL statements written in the custom DDL syntax 150, thus enabling the invocation of custom behavior at query time.

Some embodiments of the customization system 100 support the following original DDL syntax 130, which can be used to define custom DDL statements:
CREATE DEFINITION <ddl_statement>
Hereinafter, the above format will be referred to as a create format.

A DDL statement in a create format such as that shown above may define, or introduce, a custom DDL statement. Specifically, in some embodiments, the <ddl_statement> argument is an identifier (e.g., a name) of another DDL statement, where that identifier is later used to reference or build the custom DDL statement as will be described below. In some cases, the specified DDL statement used as the argument may be an original DDL statement, which will be supplanted by the custom DDL statement. For example, and not by way of limitation, an original DDL statement used as the <ddl_statement> argument may be "CREATE TABLE" or "CREATE INDEX," which are conventional DDL statements that may be supported by the original DDL syntax 130. If a custom DDL statement is created using "CREATE TABLE" as an argument, as a result conflicting with the original DDL statement, then the custom DDL statement may be invoked whenever a user initiates table creation by using an instance of the CREATE TABLE statement.

The customization system 100 may further support a mechanism for removing a custom DDL statement from the DBMS 120. In some embodiments, when a custom DDL statement is removed, its associated metadata may be deleted from the global catalog 140, and as a result, the custom DDL statement is no longer available for use in the DBMS 120. Thus, if the custom DDL statement supplanted an original DDL statement, then the original DDL statement may become available and active once the custom DDL statement is removed. By way of the original DDL syntax 130, the customization system 100 may support the following drop statement, which causes the customization system 100 remove the custom DDL statement specified:

DROP DEFINITION <ddl_statement>

For a custom DDL statement that remains active (i.e., has not been removed), the customization system 100 may enable the definition of behaviors and keywords, thus assigning functionality to the custom DDL statement. For instance, the customization system 100 may support the following DDL syntax:

CREATE BEHAVIOR FOR <ddl_statement> IN PHASE <phase_name>
LANG <programming_lang> MODULE <programming_module>

Hereinafter, the above format will be referred to as a create-behavior format.

When receiving a DDL statement in such a create-behavior format, the customization system 100 may assign a custom behavior to the DDL statement specified as an argument, which may be an original DDL statement or a custom DDL statement. As shown, the create-behavior format may include the keywords IN PHASE, LANG, and MODULE, the corresponding arguments of which respectively indicate a phase in which the desired custom behavior is applicable, a programming language, and a module implementing the custom behavior in the specified programming language.

The customization system 100 may support a set of phases in which custom behaviors can be implemented. For example, and not by way of limitation, possible supported phases may be represented by the following: DATABASE_PRE_GEN, DATABASE_GEN, DATABASE_POST_GEN, DATABASE_GEN_VALIDATION, SQL_READ, or SQL_UPDATE. Specifically, in some embodiments, DATABASE_PRE_GEN refers to a time leading to generation of a database 160; DATABASE_GEN refers to a time for generation of a database 160; DATABASE_POST_GEN refers to a time following generation of a database 160; DATABASE_GEN_VALIDATION refers to a time during which database generation is validated; SQL_READ refers to a time when data is read from a database 160 based on a Structured Query Language (SQL) query; and SQL_UPDATE refers to a time when data is updated in a database 160 based on a SQL query. It will be understood that a DBMS 120 may support a combination of these and various other phases, and that the customization system 100 may support all or a subset of the phases supported by the DBMS 120. When the applicable DDL statement is executed during the phase specified in a create-behavior format, then the defined custom behavior may be executed (i.e., by executing the module).

The <programming_lang> argument of the LANG keyword may specify a programming language, such as assembly language, Java®, C, or C++, for example. The module may be provided in the specified programming language, and by receiving an indication of the programming language used, the customization system 100 may know how to execute the module. The <programming_module> argument of the MODULE keyword may specify a module that implements the behavior being assigned to the custom DDL statement.

The customization system 100 may additionally support original DDL syntax 130 to enable removal of a custom behavior from a DDL statement. Specifically, such removal may involve removing the associated metadata from the global catalog 140. For instance, the following may result in removal of some or all custom behaviors for the specified DDL statement in the specified phase:

DROP BEHAVIOR FOR <ddl_statement> IN PHASE <phase_name>

In some embodiments, the customization system 100 may support original DDL syntax 130 enabling the addition or removal of keywords to a custom DDL statement. Specifically, for instance, the following may be supported:
CREATE KEYWORD <keyword> IN <ddl_statement> VALUETYPE <val_type>
Hereinafter, the above format will be referred to as a create-keyword format.

Generally, a keyword is associated with a defined behavior and applicable a specific DDL statement. For example, in the various types of statements mentioned above, keywords include IN, LANG, and MODULE. When receiving a DDL statement in this create-keyword format, the DBMS 120 using the customization system 100 may define the custom keyword specified by the argument <keyword> for use with the DDL statement specified by the argument <ddl_statement>. The specified DDL statement may be an original DDL statement based on original DDL syntax 130, or may be a custom DDL statement based on custom DDL syntax 150. Further, an optional VALUETYPE keyword may be included as part of the create-keyword statementformat and may take an argument <val_type>, which may describe the data type of an argument taken by the custom keyword being defined. The customization system may store metadata describing the keyword in the global catalog 140.

For example and not by way of limitation, the CCSID keyword of the CREATE TABLE statement in the DB2 DBMS is not supported in some other DBMSs 120. Thus, to enable migration from DB2 to a target DBMS 120, the CCSID keyword may be added by way of defining a custom keyword as part of custom DDL syntax 150, as follows:
CREATE KEYWORD CCSID IN 'CREATE TABLE' VALUETYPE STRING;
This example DDL statement in the create-keyword format defines the custom keyword CCSID, which takes a single string as an argument. This custom keyword is applicable to a CREATE TABLE statement, which is either defined as a custom DDL statement or is the standard CREATE TABLE statement for the DBMS 120. As will be discussed below, after the custom keyword is defined, a behavior may be added to the custom keyword.

The customization system 100 may additionally support original DDL syntax 130 to enable removal of a custom keyword. Such removal may be performed in response to, for example, a drop statement such as the following, which may result in removal of the specified keyword from the specified DDL statement.
DROP KEYWORD <keyword> IN <ddl_statement>

In some embodiments, the following original DDL syntax 130 is supported by the customization system 100 for adding a behavior to a keyword of a DDL statement. Further, in some embodiments, the keyword may be either an original or custom keyword, and the DDL statement may be either an original or custom DDL statement:

CREATE BEHAVIOR FOR <keyword> IN <ddl_statement> IN PHASE <phase_name> LANG <programming_lang> MODULE <programming_module>

Hereinafter, the above format will be referred to as a create-keyword-behavior format.

Similarly to the create-behavior format, which was described above, this create-keyword-behavior format may incorporate IN PHASE, LANG, and MODULE keywords. In some embodiments, these keywords are used in an analogous way in the create-keyword-behavior format as they are in the create-behavior format. Specifically, the LANG keyword may specify a programming language, the MODULE keyword may specify a module to be executed for implementing the custom behavior, and the IN PHASE keyword may specify a phase of the DBMS 120 in which the custom behavior is performed (i.e., the module is executed). Additionally, however, this create-keyword-behavior format also includes a command indicated by the keyword IN, which may be used to specify the DDL statement to which the keyword behavior is applicable.

Returning to the above example regarding a custom CCSID keyword, the below DDL statement in the create-keyword-behavior format may be provided to the customization system 100 to add a custom behavior to this custom keyword:
CREATE BEHAVIOR CCSID IN 'CREATE TABLE' PHASE DATABASE_GEN LANG ASSEMBLER MODULE MYCUSTOMASM.obj In this example, the custom keyword CCSID is given a custom behavior to be performed when processing a CREATE TABLE statement during the DATABASE_GEN phase (i.e., when a database is generated). Specifically, this custom behavior is implemented by MYCUSTOMASM.obj, which is written in assembly language. After this custom keyword is defined and given this custom behavior, the custom keyword may then be consumed. Specifically, in this example, during database generation, the target DBMS 120 may receive a DDL statement such as the following, for example, in which the ellipsis can represent additional arguments to the CREATE TABLE statement:
CREATE TABLE . . . CCSID Cp1047 . . . .

Upon creating the specified table during database generation and in response to the above DDL statement, the assembler module MYCUSTOMASM.obj may be automatically invoked with the argument string Cp1047, which may be passed to the module. For further example, and not by way of limitation, the module MYCUSTOMASM.obj may define a default encoding for each column as Cp1047.

For another example, the customization system 100 may be used to define a runtime behavior for managing encodings for string columns with undefined encodings. This may occur when the following DDL statements are received:
CREATE BEHAVIOR CCSID IN 'CREATE TABLE' PHASE SQL_READ LANG ASSEMBLER MODULE MYCUSTOMASMREAD.obj;
CREATE BEHAVIOR CCSID IN 'CREATE TABLE' PHASE SQL_UPDATE LANG ASSEMBLER MODULE MYCUSTOMASMUPDATE.obj The customization system 100 may additionally support original DDL syntax 130 to enable removal of a custom behavior of a keyword. Such removal may be performed in response to, for example, a drop statement such as the following, which may result in removal of some or all custom behaviors for the specified keyword in the specified phase:
DROP BEHAVIOR FOR <keyword> IN <ddl_statement> IN PHASE <phase_name>

The customization system 100 may support original DDL syntax 130 that enables addition custom phase behavior to be performed within a specified phase. For instance, the following format may be used:

---
CREATE BEHAVIOR <behavior_id> IN PHASE <phase_name> LANG <programming_lang> MODULE <programming_module>

---

Hereinafter, the above format will be referred to as a create-phase-behavior format.

Similarly to the create-behavior format described above, this create-phase-behavior format may incorporate the keywords IN PHASE, LANG, and MODULE. In some embodiments, these commands are used in an analogous way in the create-phase-behavior format as they are in the create-behavior format. Specifically, the LANG keyword may specify a programming language, the MODULE keyword may specify a module to be executed for implementing the custom behavior, and the IN PHASE keyword may specify a phase of the DBMS 120 in which the custom behavior is performed (i.e., the module is executed).

In some embodiments, a custom phase behavior for a specified phase may be global, such that the custom phase behavior is invoked during the specified phase for all database changes applicable to that specified phase. For example, and not by way of limitation, if a custom phase behavior for a specified phase is associated with a module that implements custom compression, then that custom compression may be performed each time the specified phase is entered.

The customization system 100 may additionally support original DDL syntax 130 to enable removal of a custom phase behavior. Such removal may be performed in response to, for example, a drop statement such as the following, which may result in removal of the specified custom behavior in the specified phase:
DROP BEHAVIOR <behavior_id> IN PHASE <phase_name>

A custom DDL statement may be used, or consumed, after having been defined as described above. In some embodiments, given that metadata describing the custom DDL statements is stored in a global catalog 140, the custom DDL statements are applicable to all database 160 of the DBMS 120. Thus, when custom DDL syntax 150 is used, such as by being received from a human or automated user, that custom DDL syntax 150 may be recognized and processed. This processing may occur through checking the metadata of the global catalog 140, but to a user, the processing may appear the same for custom DDL syntax 150 as for original DDL syntax 130.

Figure 2:
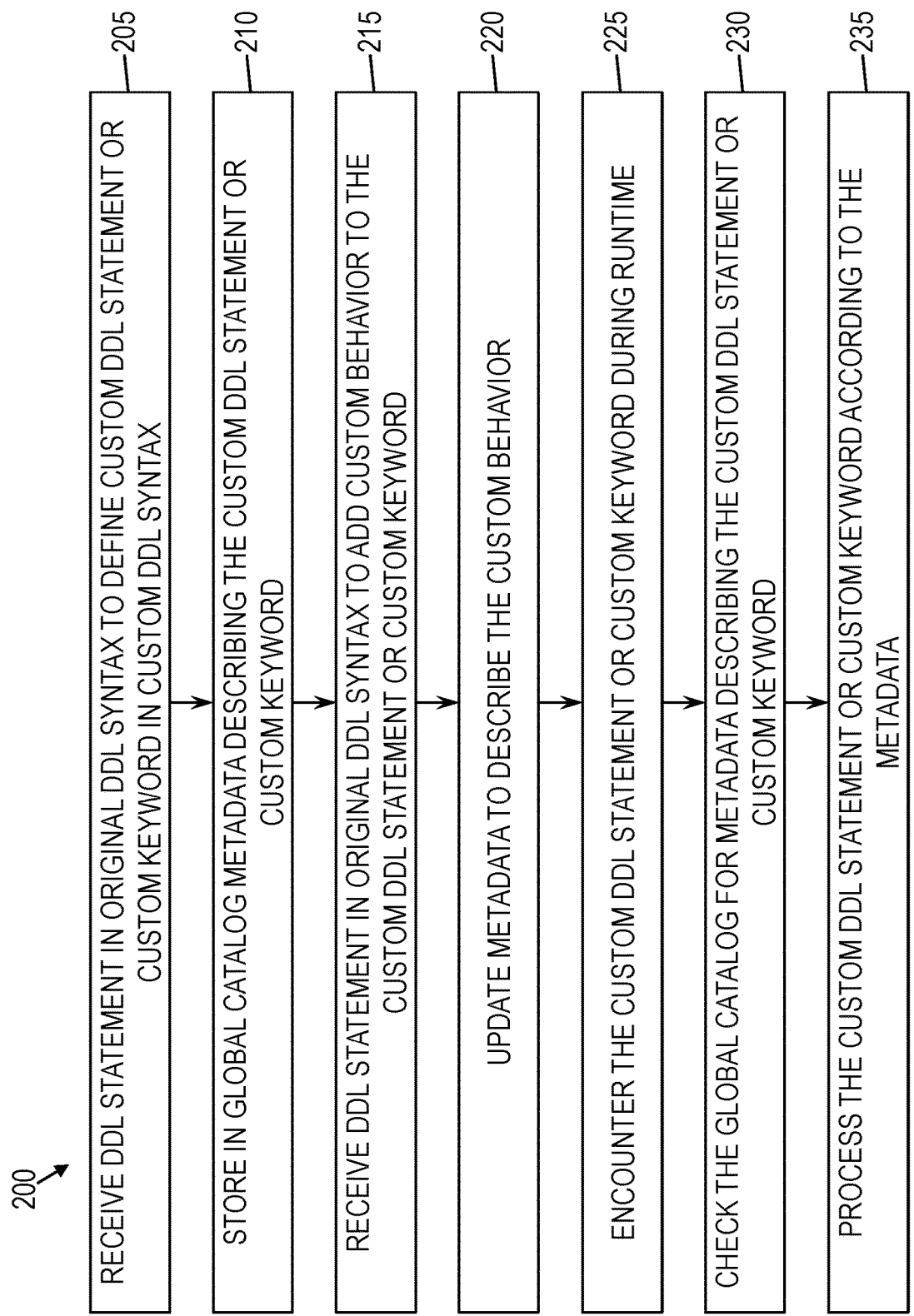
FIG. 2 is a flow diagram of a method for defining and consuming a custom data definition language statement or a custom keyword as part of custom DDL syntax, according to some embodiments of this invention.

FIG. 2 is a flow diagram of a method 200 for defining and consuming a custom DDL statement or custom keyword as part of custom DDL syntax 150, according to some embodiments of this invention. As shown in FIG. 2, at block 205, a DDL statement may be received according to original DDL syntax 130 to define a custom DDL statement or custom keyword. At block 210, metadata describing the custom DDL statement or custom keyword may be stored in the global catalog 140, and as a result the custom DDL statement or custom keyword may become part of custom DDL syntax 150 of the DBMS 120. At block 215, a DDL statement may be received according to original DDL syntax 130 to add a behavior to the custom statement or custom keyword. At block 220, the metadata associated with the custom DDL statement or custom keyword in the global catalog 140 may be updated to describe the custom behavior. At block 225, the custom DDL statement or custom keyword may be encountered during runtime (e.g., during query time). At block 230, the customization system 100 may check the global catalog 140 for the associated metadata. At block 235, the customization system 100 may process the custom DDL statement or custom keyword according to the associated metadata.

Figure 3:
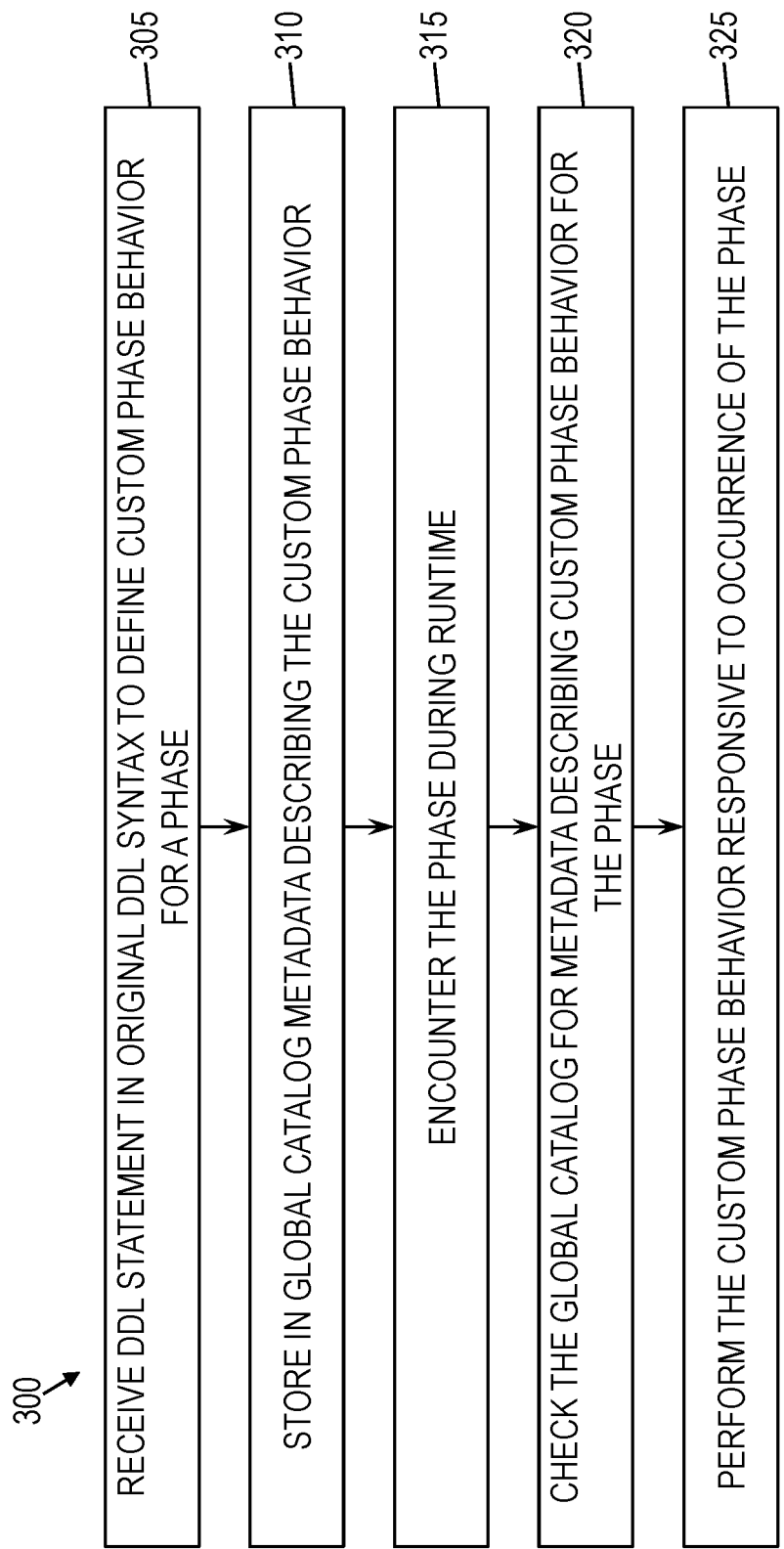
FIG. 3 is a flow diagram of a method for defining and consuming a custom phase behavior as part of custom DDL syntax, according to some embodiments of this invention.

FIG. 3 is a flow diagram of a method 300 for defining a custom phase behavior as part of custom DDL syntax 150, according to come embodiments of this invention. As shown, at block 305, a DDL statement may be received according to original DDL syntax 130 to define a custom phase behavior for a phase of the DBMS 120. At block 310, metadata describing the custom phase behavior may be stored in association with the phase in the global catalog 140, and as a result the custom phase behavior may become part of the custom DDL syntax 150 of the DBMS 120. At block 315, the phase may be encountered during runtime. At block 320, the customization system 100 may check the global catalog 140 for custom phase behavior associated with the phase and may thus identify the custom phase behavior. At block 325, the customization system 100 may perform the custom phase behavior responsive to occurrence of the phase.

Figure 4:
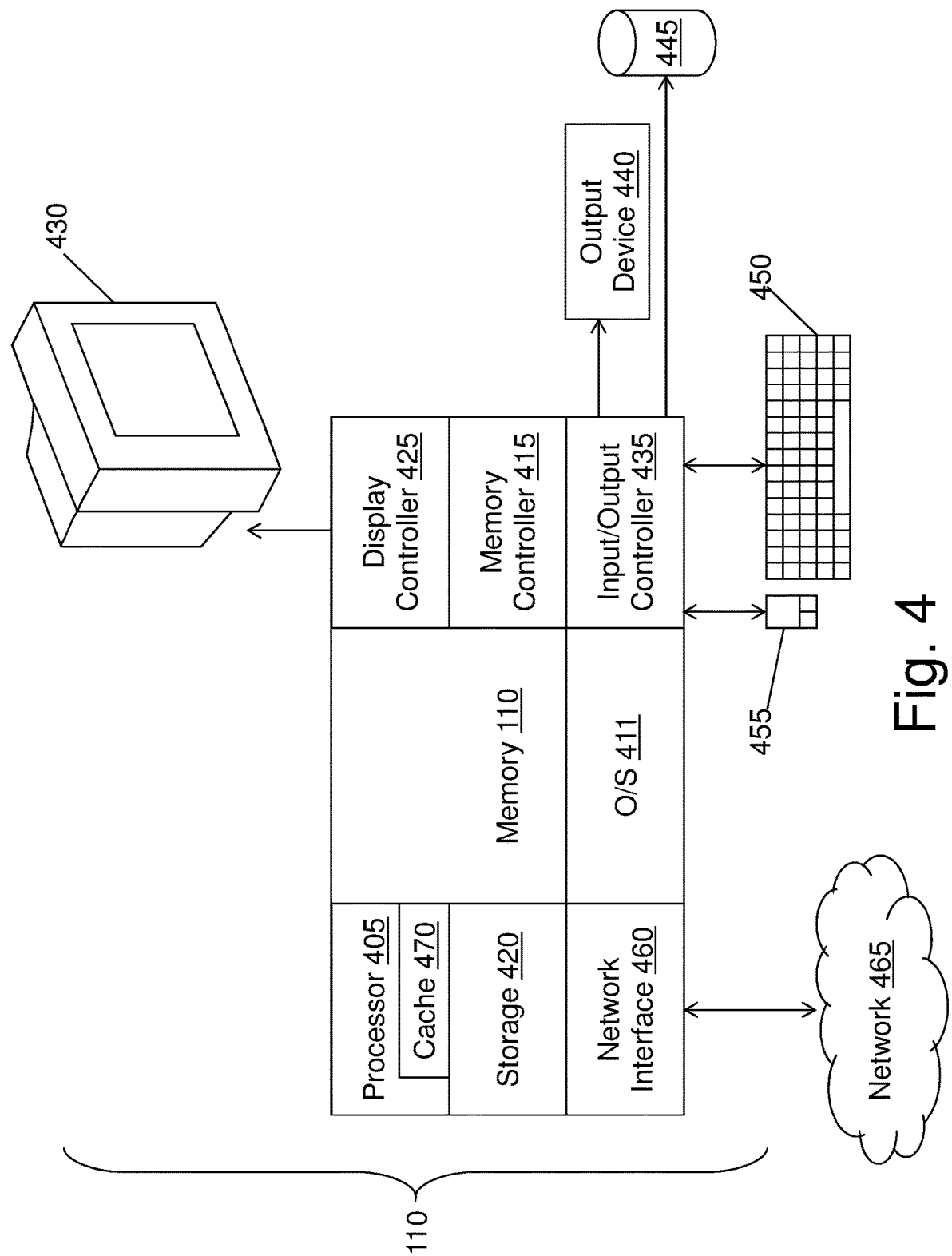
FIG. 4 is a block diagram of a computer system for implementing some or all aspects of the customization system, according to some embodiments of this invention.

FIG. 4 illustrates a block diagram of a computer system 110 for use in implementing a customization system 100 or method according to some embodiments. The customization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 110, such as a personal computer, workstation, minicomputer, or mainframe computer.

In some embodiments, as shown in FIG. 4, the computer system 110 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 110, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the customization systems 100 and methods of this disclosure.

The computer system 110 may further include a display controller 425 coupled to a display 430. In some embodiments, the computer system 110 may further include a network interface 460 for coupling to a network 465. The network 465 may be an IP-based network for communication between the computer system 110 and an external server, client and the like via a broadband connection. The network 465 transmits and receives data between the computer system 110 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Customization systems 100 and methods according to this disclosure may be embodied, in whole or in part, in computer program products or in computer systems 110, such as that illustrated in FIG. 4.

Technical effects and benefits of some embodiments include the ability to define custom DDL syntax 150 in a DBMS 120, through the use of unconventional original DDL syntax 130 supported by the DBMS 120. With the original DDL syntax 130, custom DDL statements, keywords, and phase behavior may be defined, and their descriptions may be stored in metadata in the global catalog 140. Thus, when a custom DDL statements or custom keyword is encountered, it may be processed based on the metadata. Further, when a phase occurs, a custom phase behavior may be executed according to the metadata and responsive to the phase's occurrence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, via original Data Definition Language (DDL) syntax of a Database Management System (DBMS), a definition of custom DDL syntax, wherein the custom DDL syntax comprises a custom DDL statement and wherein the custom DDL statement conflicts with an original DDL statement of the DBMS;
receiving a reference to a programming module implementing a custom behavior applicable to the custom DDL statement;
storing in a global catalog of the DBMS metadata describing the custom DDL syntax;
receiving a first DDL statement that utilizes the custom DDL syntax, wherein the first DDL statement is an instance of the custom DDL statement;
reading from the global catalog the metadata describing the custom DDL syntax;
processing, using a computer processor, both original DDL syntax and the custom DDL syntax, wherein processing the custom DDL syntax includes processing the first DDL statement according to the metadata and wherein the processing the first DDL statement according to the metadata comprises executing the programming module, responsive to receiving the first DDL statement being an instance of the custom DDL statement; and prioritizing the custom DDL statement over the original DDL statement, wherein the custom DDL statement supplants the original DDL statement.

2. The computer-implemented method of claim 1, wherein the custom DDL syntax comprises a custom keyword, and further comprising:

receiving a reference to a programming module implementing a custom behavior applicable to the custom keyword;

wherein the first DDL statement utilizes the custom keyword; and wherein the processing the first DDL statement according to the metadata comprises executing the programming module responsive to receiving the first DDL statement utilizing the custom keyword.

3. The computer-implemented method of claim 1, further comprising:

receiving an indication of a specific phase during which the custom DDL statement is applicable;

wherein the processing the first DDL statement according to the metadata occurs in the specified phase; and wherein the processing the first DDL statement according to the metadata comprises executing the programming module, responsive to receiving the first DDL statement utilizing the custom DDL statement and responsive to the processing occurring in the specified phase.

4. The computer-implemented method of claim 1, further comprising:

receiving an instruction to drop the custom DDL statement;

removing from the global catalog a portion of the metadata related to the custom DDL statement; and activating the original DDL statement responsive to removing the portion of the metadata related to the custom DDL statement.

5. The computer-implemented method of claim 1, wherein the custom DDL syntax comprises a custom phase behavior applicable to a specific phase of the DBMS, and further comprising:

receiving a reference to a programming module implementing the custom phase behavior applicable to the specific phase; and executing the programming module during the specific phase responsive to occurrence of the specific phase.

6. A system comprising:

a memory having computer-readable instructions; and one or more hardware processors for executing the computer-readable instructions, the computer-readable instructions comprising:

receiving, via original Data Definition Language (DDL) syntax of a Database Management System (DBMS), a definition of custom DDL syntax, wherein the custom DDL syntax comprises a custom DDL statement and wherein the custom DDL statement conflicts with an original DDL statement of the DBMS;

receiving a reference to a programming module implementing a custom behavior applicable to the custom DDL statement;

storing in a global catalog of the DBMS metadata describing the custom DDL syntax;

receiving a first DDL statement that utilizes the custom DDL syntax, wherein the first DDL statement is an instance of the custom DDL statement;

reading from the global catalog the metadata describing the custom DDL syntax;

processing both original DDL syntax and the custom DDL syntax, wherein processing the custom DDL syntax includes processing the first DDL statement according to the metadata and wherein the processing the first DDL statement according to the metadata comprises executing the programming module, responsive to receiving the first DDL statement being an instance of the custom DDL statement; and prioritizing the custom DDL statement over the original DDL statement, wherein the custom DDL statement supplants the original DDL statement.

7. The system of claim 6, wherein the custom DDL syntax comprises a custom keyword, and the computer-readable instructions further comprising:

receiving a reference to a programming module implementing a custom behavior applicable to the custom keyword;

wherein the first DDL statement utilizes the custom keyword; and wherein the processing the first DDL statement according to the metadata comprises executing the programming module responsive to receiving the first DDL statement utilizing the custom keyword.

8. The system of claim 6, the computer-readable instructions further comprising:

receiving an indication of a specific phase during which the custom DDL statement is applicable;

wherein the processing the first DDL statement according to the metadata occurs in the specified phase; and wherein the processing the first DDL statement according to the metadata comprises executing the programming module, responsive to receiving the first DDL statement utilizing the custom DDL statement and responsive to the processing occurring in the specified phase.

9. The system of claim 6, the computer-readable instructions further comprising:

receiving an instruction to drop the custom DDL statement;

removing from the global catalog a portion of the metadata related to the custom DDL statement; and activating the original DDL statement responsive to removing the portion of the metadata related to the custom DDL statement.

10. The system of claim 6, wherein the custom DDL syntax comprises a custom phase behavior applicable to a specific phase of the DBMS, and the computer-readable instructions further comprising:

receiving a reference to a programming module implementing the custom phase behavior applicable to the specific phase; and executing the programming module during the specific phase responsive to occurrence of the specific phase.

11. A computer-program product for utilizing custom syntax in a Database Management System (DBMS), the computer-program product comprising a non-transitory computer-readable storage medium having program instructions embodied therewith, the program instructions executable by a processor to cause the processor to perform a method comprising:

receiving, via original Data Definition Language (DDL) syntax of a DBMS, a definition of custom DDL syntax, wherein the custom DDL syntax comprises a custom DDL statement and wherein the custom DDL statement conflicts with an original DDL statement of the DBMS;

receiving a reference to a programming module implementing a custom behavior applicable to the custom DDL statement;
  storing in a global catalog of the DBMS metadata describing the custom DDL syntax;
  receiving a first DDL statement that utilizes the custom DDL syntax, wherein the first DDL statement is an instance of the custom DDL statement;
  reading from the global catalog the metadata describing the custom DDL syntax;
  processing both original DDL syntax and the custom DDL syntax, wherein processing the custom DDL syntax includes processing the first DDL statement according to the metadata and wherein the processing the first DDL statement according to the metadata comprises executing the programming module, responsive to receiving the first DDL statement being an instance of the custom DDL statement; and
  prioritizing the custom DDL statement over the original DDL statement, wherein the custom DDL statement supplants the original DDL statement.

12. The computer-program product of claim 11, wherein the custom DDL syntax comprises a custom keyword, and the method further comprising:
  receiving a reference to a programming module implementing a custom behavior applicable to the custom keyword;
  wherein the first DDL statement utilizes the custom keyword; and
  wherein the processing the first DDL statement according to the metadata comprises executing the programming module responsive to receiving the first DDL statement utilizing the custom keyword.

13. The computer-program product of claim 11, the method further comprising:
  receiving an instruction to drop the custom DDL statement;
  removing from the global catalog a portion of the metadata related to the custom DDL statement; and
  activating the original DDL statement responsive to removing the portion of the metadata related to the custom DDL statement.

14. The computer-program product of claim 11, wherein the custom DDL syntax comprises a custom phase behavior applicable to a specific phase of the DBMS, and the method further comprising:
  receiving a reference to a programming module implementing the custom phase behavior applicable to the specific phase; and
  executing the programming module during the specific phase responsive to occurrence of the specific phase.

* * * * *